United States Patent
Hammond

[19]

[11] Patent Number: 6,166,513
[45] Date of Patent: Dec. 26, 2000

[54] FOUR-QUADRANT AC-AC DRIVE AND METHOD

[75] Inventor: Peter W. Hammond, Greensburg, Pa.

[73] Assignee: Robicon Corporation, New Kensington, Pa.

[21] Appl. No.: 09/543,971

[22] Filed: Apr. 7, 2000

Related U.S. Application Data

[60] Provisional application No. 60/128,585, Apr. 9, 1999.

[51] Int. Cl.$^7$ ........................................ H02P 7/36
[52] U.S. Cl. .......................... 318/764; 318/762
[58] Field of Search ............... 363/71; 318/798, 318/764, 757, 759, 762

[56] References Cited

U.S. PATENT DOCUMENTS

| | | |
|---|---|---|
| 4,319,177 | 3/1982 | Kawada et al. . |
| 4,426,610 | 1/1984 | Kawada et al. . |
| 4,434,393 | 2/1984 | Kobari et al. . |
| 4,788,635 | 11/1988 | Heinrich . |
| 4,843,296 | 6/1989 | Tanaka . |
| 4,928,052 | 5/1990 | Fujioka et al. . |
| 5,625,545 | 4/1997 | Hammond . |
| 6,014,323 | 1/2000 | Aiello et al. ........................ 363/71 |

FOREIGN PATENT DOCUMENTS

| | | |
|---|---|---|
| 0 451 570 B1 | 10/1991 | European Pat. Off. . |
| 0 597 409 A1 | 5/1994 | European Pat. Off. . |
| 0 782 783 B1 | 7/1997 | European Pat. Off. . |
| 0 782 784 B1 | 7/1997 | European Pat. Off. . |
| 6141559 | 10/1992 | Japan . |
| 8317693A | 5/1995 | Japan . |
| 10162945 | 11/1996 | Japan . |
| 10172746 | 12/1996 | Japan . |

OTHER PUBLICATIONS

*Development of a Regenerative Three–Phase Multicell Inverter,* Jose Rodriguez, Antonio Gonzalez and Cesar Silva, Department de Electronica, Universidad Tecnia Federico Santa Maria, pp. 1–12, undated, No Date.

*Primary Examiner*—Shawn Riley
*Attorney, Agent, or Firm*—Buchanan Ingersoll, P.C.

[57] ABSTRACT

An electric drive apparatus and method for controlling medium-voltage alternating current motors wherein a multi-phase power transformer having multiple secondary windings provides multi-phase power to multiple power cells which provide four quadrant operation. Each power cell has a single-phase output and is controllable by a modulation controller. The power cells are connected in series thus permitting the maximum output voltage for each cell to be less than the maximum line-to-line voltage. Each power cell can have a rectifier portion to convert input AC-to-DC, capacitors, an output DC-to-AC inverter, a regenerative bridge converter connected in parallel with the rectifier portion and a local modulation controller connected to a master controller.

5 Claims, 5 Drawing Sheets

ID is a diagram of a prior art medium voltage
FOUR-QUADRANT AC-AC DRIVE AND METHOD

BACKGROUND OF THE INVENTION

This application claims benefit of Provisional Application Ser. No. 60/128,585 filed Apr. 9, 1999.

1. Field of the Invention

The invention relates to a variable-speed motor drive and method for operating such a drive, and more particularly to a variable sped motor drive having four-quadrant operation.

2. Description of the Prior Art

In U.S. Pat. No. 5,625,545 to Hammond, which is hereby incorporated herein by reference, an electric drive apparatus and method for controlling medium-voltage alternating current motors is disclosed having a multiphase power transformer with multiple secondary windings which provides multi-phase power to multiple, series connected power cells, each having a single phase output and being controlled by a modulation controller. The primary and secondary windings in the power transformer may be star- or mesh-connected and; the secondary windings may be shifted in phase. Because the power cells are connected in series at the output, the maximum output voltage for each cell may be less than the maximum line-to-line voltage. Each power cell can have a tri-state output controllable using pulse-width modulation techniques. AC input power is converted to DC output power for each output phase. Output power modulation can be produced by inter-digitizing a selected number of carrier signals so that harmonic components reflected back to the input are attenuated.

Although that medium voltage drive provides only two quadrant operation, such medium voltage AC drives are inherently capable of operating in all four quadrants of the speed-torque plane. The first quadrant is where both speed and torque are positive and the third quadrant is where both speed and torque are negative. Thus, in the first and third quadrants, the product of torque and speed is positive. When the product of the torque speed is positive, power flow goes into the mechanical load of the motor. In contrast, second and fourth quadrants are those where the product torque speed is negative, i.e., when the motor is acting as a generator and power is flowing from the mechanical load through the motor and back to the inverter side of the drive.

Conventional medium voltage, multiple power cell AC drives, such as the drive disclosed in the aforementioned Hammond patent, are not presently capable of operating in four quadrants. However, it is known to use a low voltage drive having a single power cell which is capable of operating in four-quadrants for providing power regeneration. One example of a four quadrant power cell is disclosed in U.S. Pat. No. 4,788,635 to Heinrich. Heinrich discloses that the invention is applicable to a voltage-switch inverter motor drive operating through the four voltage-current quadrants, involving regenerative mode operation. Heinrich discloses that this is accomplished by controlling the voltage-source inverter on an AC input side to reverse the DC-link polarity thereof, while switching across the DC-link terminal connection to the inverter side thereof, so as to match the polarities. It is disclosed that this is accomplished by the implementation of such matching of polarities with cross-coupled GTO devices associated with the two diodes coupled with the respective poles of a DC-link capacitor between the output of the rectifier thyristor bridge and the DC-link terminal of the voltage-source inverter motor drive. The GTO devices are interrupted with a duty cycle selected in response to the voltage difference between the inverter DC input voltage and a constant reference voltage.

However, such single power cell configurations for providing four quadrant operation can have significant disadvantages due to undesirable harmonics, which are created even at no load situations. Furthermore, this configuration does not contemplate the desirability of, or in some cases the need for, a separate bridge of rectifying diodes, which are typically employed in medium voltage, multiple power cell AC drives of the kind disclosed in the aforementioned Hammond patent.

Four quadrant operation can be very desirable in medium voltage AC drive applications because the regenerated power can be used to offset the cost of electricity which must be purchased from utility companies. For some users of such medium voltage, multiple power cell AC drives, energy requirements can be significant, and even a 5–10% power savings, due to the regenerative capability of the drive, can be a significant cost savings. Consequently, it is desirable to provide four quadrant operation for medium voltage, multiple power cell AC drives. Additionally, it is advantageous that such four quadrant operation can be provided with minimal changes to the power drive, except for substituting a new power cell, configured for four quadrant operation, in place of the two quadrant power cells conventionally employed in those drives.

SUMMARY OF THE INVENTION

The invention provides for a medium-voltage drive for use with a three-phase AC motor having four quadrant operation, and a method for operating such a drive. Just as in the Hammond patent incorporated herein, the drive employs multiple power cells in each phase output line to the three-phase AC motor. These power cells on any given phase output line can be connected serially and the return end of each group of power cells can be connected to a floating neutral in a star configuration. The three-phase AC input power can be supplied to each cell by way of a transformer which may contain multiple three-phase secondary winding circuits, each of which may be dedicated to supply one corresponding power cell with three-phase AC power input.

In addition to the power cell containing an input AC-to-DC rectifier portion, capacitors, output DC-to-AC inverter portion and control circuit, a four quadrant power cell according to the present invention can further include a regenerative bridge converter, preferably of IGBT's, connected in parallel with the rectifier portion of the power cell. In this configuration, the regenerative bridge is maintained in an ON state and will automatically feed power back into the line whenever a predetermined voltage across the capacitors is detected as a result of the motor pushing power voltage back through the inverter portion.

Other details, objects and advantages of the invention will become apparent from the following detailed description of certain presently preferred embodiments thereof.

BRIEF DESCRIPTION OF THE DRAWINGS

A more complete understanding of the invention can be obtained by considering the following detailed description in conjunction with the accompanying drawing figures, wherein.

DESCRIPTION OF PREFERRED EMBODIMENTS

Figure 1:
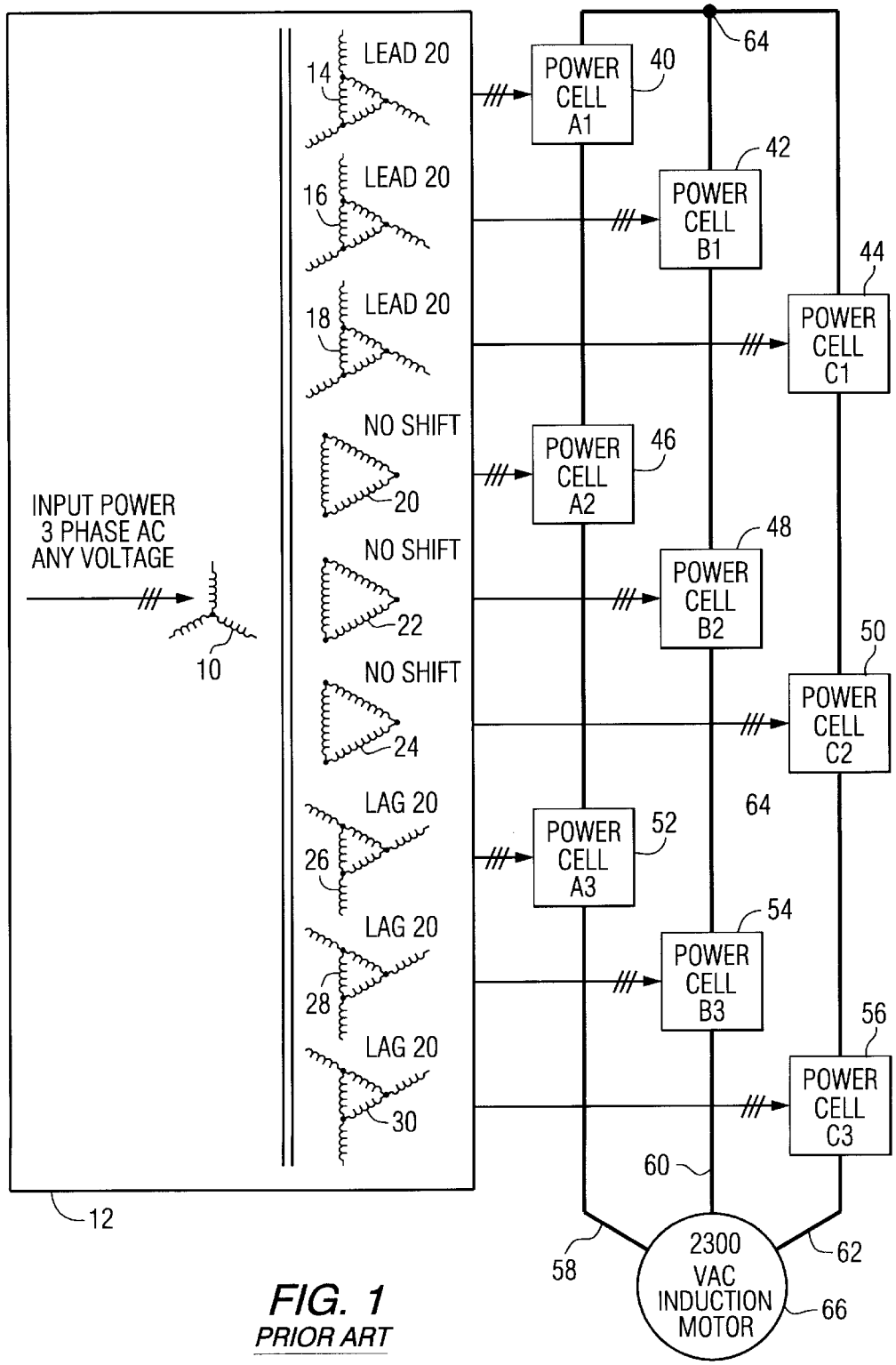
FIG. 1 is a diagram of a prior art medium voltage pulse-width modulation topology.

As shown in FIG. 1, three-phase AC input power is supplied to the primary winding circuit 10 of power supply transformer 12. The primary winding circuit 10 energizes three-phase secondary winding circuits 14 through 30. The three-phase power associated with each of secondary winding circuits 14 through 30 can be supplied to power cells 40 through 56, respectively. In the configuration shown, mesh-connected secondary winding circuits 14 through 30 are used to lower the supply transformer's K-factor and to improve harmonics control. Additionally, one-third of the secondary winding circuits can be advanced in phase by 20°, and one-third of the secondary winding circuits can be delayed in phase by 20°. The remaining third of the secondary winding circuits can remain unshifted. For other voltages, when a different number of cells are used, the respective phase shifts needed can be obtained by dividing 60° by the number of cells per phase.

As shown, multiple power cells 40–56 are connected to each of the phase output lines 58, 60, 62, which can represent phase A, Phase B and Phase C, respectively. The multiple power cells 40–56 are connected in series on each phase output line, making it possible to produce a medium-voltage output phase line controller with a plurality of low-voltage power cells. Serial connections also make multiple voltage states per phase possible, which can be used to obtain improved current waveforms. The individual power cells 40–56 may be isolated from ground, and other power cells, using insulation suitable for the medium voltage level being used.

In FIG. 1, phase output line 58 is serially connected with power cells 40, 46, 52, phase output line 60 is serially connected with power cells 42, 48, 54, and phase output line 62 is serially connected with power cells 44, 50, 56. The power cells feeding branches 58, 60, 62 are joined by a WYE connection at 64 which forms a floating neutral. Thus configured, power cells 40 through 56 can impress a sufficient medium-voltage line-to-line voltage on the motor 66, even though each power cell itself is constructed internally of components rated to low-voltage standards.

Due to the serial connection between three of the power cells in each phase output line, for example power cells 40, 46, 52 in phase output line 58, it is possible to produce a maximum output voltage magnitude of about 1800 VDC above neutral. Moreover, each power cell can be operated independently of the other cells.

Figure 2:
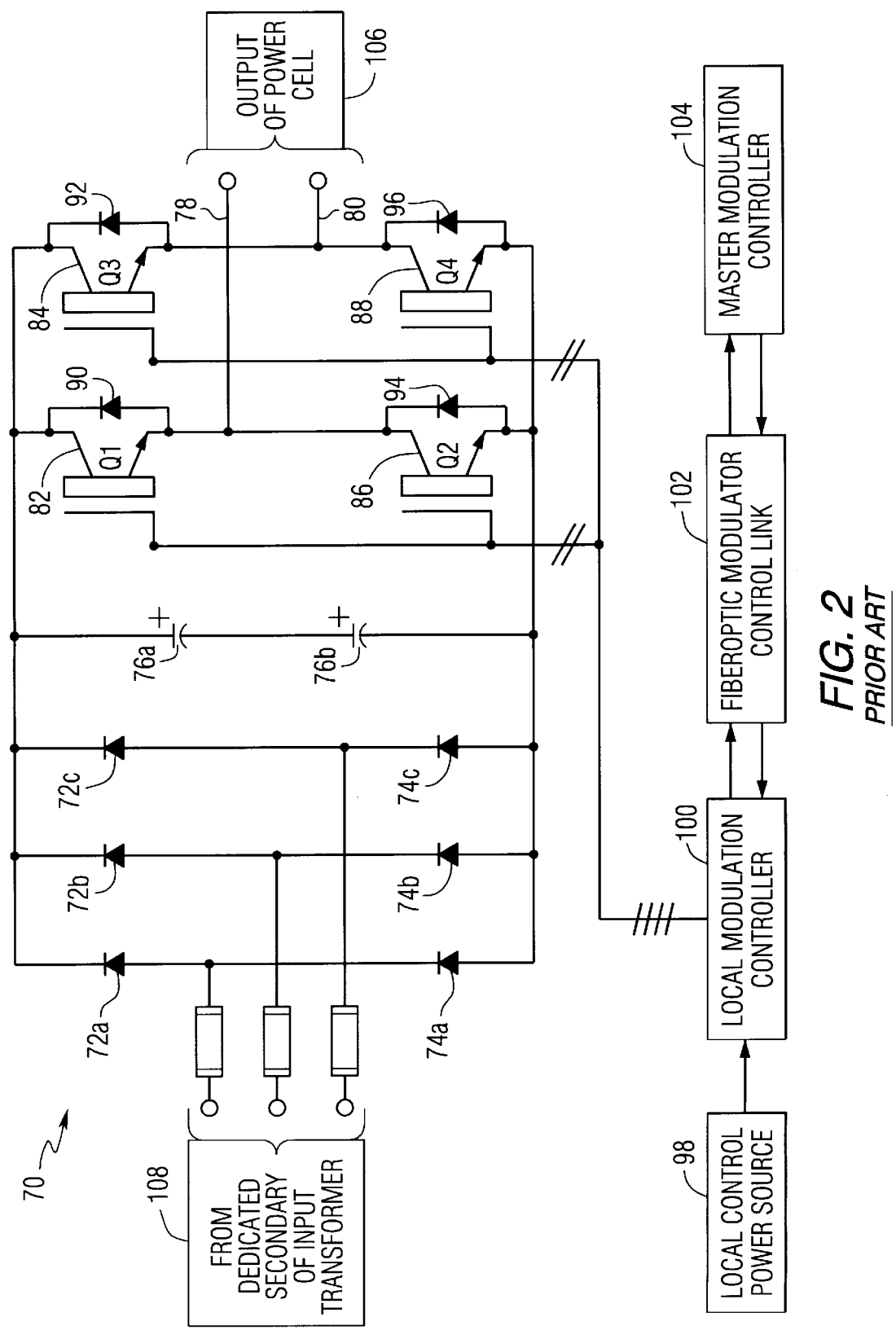
FIG. 2 is a schematic diagram of a prior art power cell.

A schematic of a prior art power cell 70, as used in a device such as in FIG. 1, is shown in FIG. 2. The power cell 70 converts three-phase AC power into a filtered DC power output. In this case, rectification is performed by diodes. Rectifying diodes 72a–72c and 74a–74c are activated by the dedicated three-phase AC secondary winding circuit on the power transformer 108. One phase may be connected between diodes 72b and 74b; another phase may be connected between diodes 72a and 74a; and the third phase may be connected between diodes 72c and 74c.

Rectification can produce a ripple current and single-phase H-bridge output converters can reflect a ripple current at twice the frequency of motor 66. Consequently smoothing capacitors 76a, 76b, are provided which act as a current smoothing filter. Capacitors 76a, 76b are representative of a capacitor bank, the precise values of which may depend upon the power requirements of the inductive load.

Figure 4:
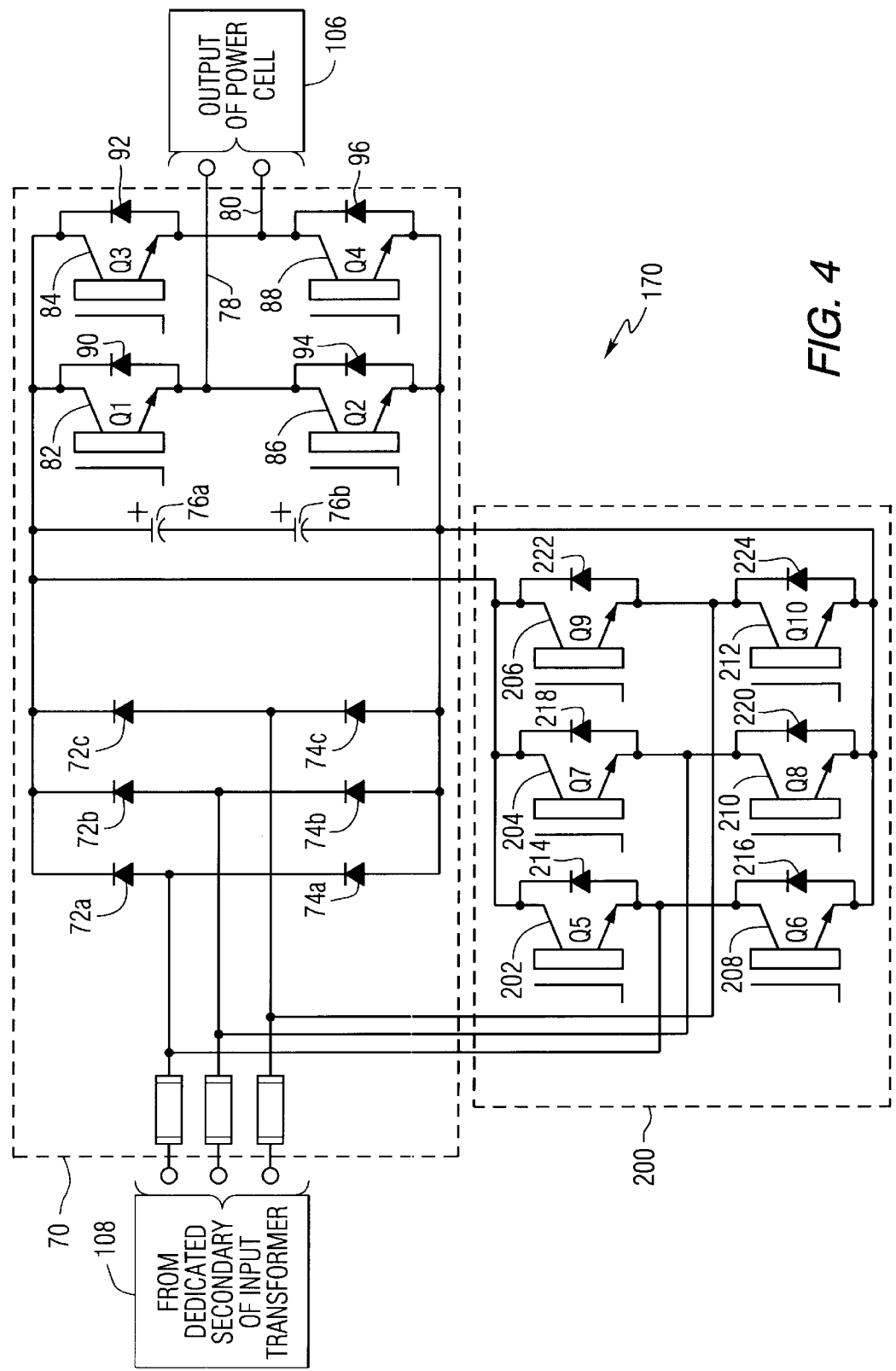
FIG. 4 is a schematic of a presently preferred embodiment of a regenerative capable power cell according to the present invention.

The DC power, thus conditioned, can be selectively supplied to output lines 78 and 80 using pulse-width modulation which can be effected using a bridge converter composed of semiconductor switches. In FIG. 4, these switches are power transistors 82 (Q1), 84 (Q3), 86 (Q2), and 88 (Q4). Transistors 82 through 88 are typically either fully ON or fully OFF as they operate, and do not significantly modulate pulse amplitude.

The transistors 82 through 88 are connected in a single-phase H-bridge configuration. To form the H-bridge configuration, it is preferred to connect the emitter of transistor 82 (Q1) to the collector of transistor 86 (Q2). Similarly, the emitter of transistor 84 (Q3) is connected to the collector of transistor 88 (Q4). Transistor pairs 82, 86, i.e., Q1 and Q2, and 84, 88, i.e., Q3 and Q4, are each connected to the DC power supply with the collectors of transistors 82 (Q1), 84 (Q3) being connected to the positive side and the emitters of transistors 86 (Q2), 88 (Q4) being connected to the negative side.

Overvoltage protection of each of transistors 82 through 88 is accomplished by use of anti-parallel diodes 90 through 96. In such an arrangement, the cathode of diodes 90 through 96 is connected to the collector of transistors 82 through 88, respectively, and the anodes of diodes 90 through 96 is connected to the emitters of transistors 82 through 88, respectively. Transistors 82 through 88 typically as bipolar transistors or insulated gate bipolar transistors (IGBTs). Often such transistors include the anti-parallel diodes in one package.

Power, in the form of pulse-width-modulated pulses, is delivered to a first phase output line segment 78 by a connection between the emitter of transistor 82 (Q1) and the collector of transistor 86 (Q2). Likewise, power is delivered to a second phase output line segment 80 by a connection between the emitter of transistor 84 (Q3) and the collector of transistor 88 (Q4).

Transistors 82 through 88 can receive controlling signals from local modulation controller 100 through suitable isolation means. Such controller 100 may be typified by Fuji part number EXP841, although other gating controllers may be used. Isolation may be provided by fiber-optic means. Controller 100 selects either of transistor 82 (Q1) or 86 (Q2) to be ON, and either of transistor 84 (Q3) or 88 (Q4) to be ON, which will permit power to pass to a load 108 by way of the first phase output line segment 78 or the second phase output line segment 80, respectively. Fiber-optic modulator control links 102 can be used to electrically isolate all circuits in any one power cell from all circuits in any other power cell, and to reduce electromagnetic interference effects which may be imposed between local controller 100 and master modulation controller 104. Local modulation controller 100 can receive power from local control power source 98 which may be electrically connected to secondary winding circuit input 108.

As heretofore mentioned regarding this presently preferred embodiment, each power cell 70 may have only three possible output voltages at any instant in time. For example, if transistors 82 (Q1) and 88 (Q4) are ON, the output can be +600 volts between first and second phase output line segments 78 and 80, respectively. If transistors 86 (Q2) and 84 (Q3) are ON, the output between line portions 78 and 80 can be −600 volts. Finally, if either transistors 82 (Q1) and 84 (Q3), or 86 (Q2) and 88 (Q4) are ON, the output between line segments 78 and 80 can be zero volts.

The embodiments herein employ voltage-source topology, where the combination of power cells 70 determine the phase voltage, but the load determines the current. Accordingly, it is preferred to provide a current path at all times between phase output line segments 78 and 80 because (1) other cells in series with cell 70 may be producing a non-zero voltage across output line segments 78 and 80 when cell 70 is at zero volts, and (2) inductive loads demand a continuous path for current flow. Therefore, the method for controlling the operational state of power cell 70 includes controlling the semiconductor switches, here transistors 82 through 88, such that each power cell 70 conducts current at a predetermined voltage, with a predetermined polarity, and for a predetermined pulse duration.

Figure 3:
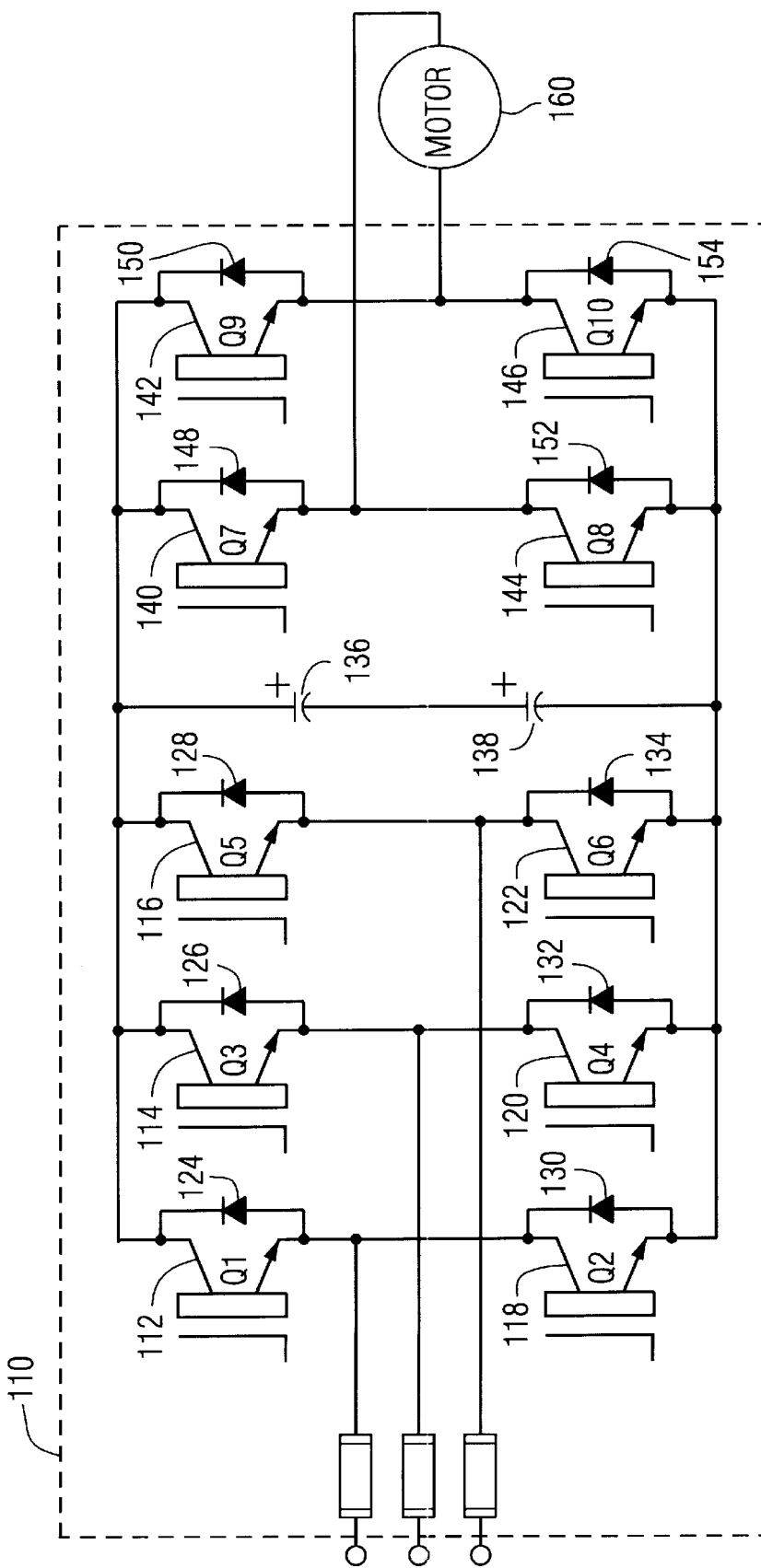
FIG. 3 is a schematic diagram of a prior art single power cell capable of four quadrant operation.

FIG. 3 shows a prior art motor controller. In this circuit a motor 160 is controlled in four quadrant operation through the use of a regenerative drive. As shown, motor 160 is single phase. However, it is to be understood that multi-phase motors could also utilize this type of design. A three phase incoming line utilizes a conventional bridge circuit using IGBTs (Q1 through Q6) to provide a source of DC to capacitors 136 and 138. The DC power from the capacitors is then converted into adjustable frequency power through IGBT switches Q7–Q10. As will be understood by those familiar with the art, IGBT units have an inherent reversed biased diode within the IGBT structure. These diodes, 124–134 and 148–154, are shown in the diagram. The output inverter bridge circuit, Q7 through Q10, operates by switching to the desired frequency with switch units Q7 through Q10. In this way, the motor can be controlled in a motoring fashion. During regeneration conditions motor 160 can regenerate through the bridge diodes 148–154. In this way, energy from the regenerating motor is delivered to the capacitors 136, 138. The bridge circuit utilizing Q1 through Q6 is a bi-directional fill four quadrant bridge. In this way, the charge placed on the capacitors 136, 138 may be appropriately switched with transistors Q1 through Q6 to feed power from the regenerating motor 160 back into the three phase line. The diodes 124–134 can act in a purely rectification mode during a motor operation where energy from the line is being delivered to motor 160. In a similar reverse manner, IGBTs 112–122 can be controlled through the use of appropriate firing circuitry to force power back into the AC line thereby providing a regenerative circuit.

A presently preferred embodiment of a four quadrant power cell 170 according to the invention is shown in FIG. 4. The rectifier portion, diodes 72a–74c, capacitors 76a, 76b and inverter portion, IGBTs 82–88 operate in the same manner previously described in connection with FIG. 2. In addition, a second bridge converter 200 can be incorporated in parallel with the rectifier portion to provide power regeneration capability. However, instead of simply replacing the rectifying portion, i.e. rectifying diodes 72a–74c, with a bridge of IGBTs 112–126, as shown in the prior art four quadrant power cell 110 in FIG. 3, the second bridge converter 200, IGBTs 202–212, is provided in addition to the rectifying diodes 72a–74c.

Several advantages are realized by this configuration. For example, the regenerative bridge 200 can be gated to be on line, occurring whenever the DC-link voltage exceeds the input voltage, to automatically feed power back into the line whenever the motor pushes power back through the inverter portion. In such a case, whenever a predetermined voltage across the capacitors 76a, 76b is detected, the regenerative bridge converter 200 will automatically feed power back into the line. In contrast, the reverse bias diodes 124–134, in the prior art four quadrant power cell 110 shown in FIG. 3, cannot support the inrush current required by the capacitors 136 and 136.

The configuration of the regenerative power cell 170 also provides several other advantages over both the prior art power cells 70 and 110, shown in FIGS. 2 and 3, respectively. For example, by virtue of the regenerative bridge 200 connected in parallel with the rectifier portion, less expensive IGBTs can be employed. This is because the diodes internal to the IGBTs are for forward rectification since their primary function as part of the IGBT is not simply rectification. IGBTs with higher rated diodes are available, but they are more expensive. As a result, in order for the prior art four quadrant art power cell 110 to safely and reliably rectify high incoming voltages, such as in the environment in which the invention is used, more expensive IGBTs would be required.

In fact, the regenerative portion, bridge converter 200, can preferably not be used at all in the forward rectification mode. Consequently, the reverse bias diodes 214–224 are not even necessary. The IGBTs 202–212 could be ordered from a manufacturer without such internal diodes 214–224.

Figure 5:
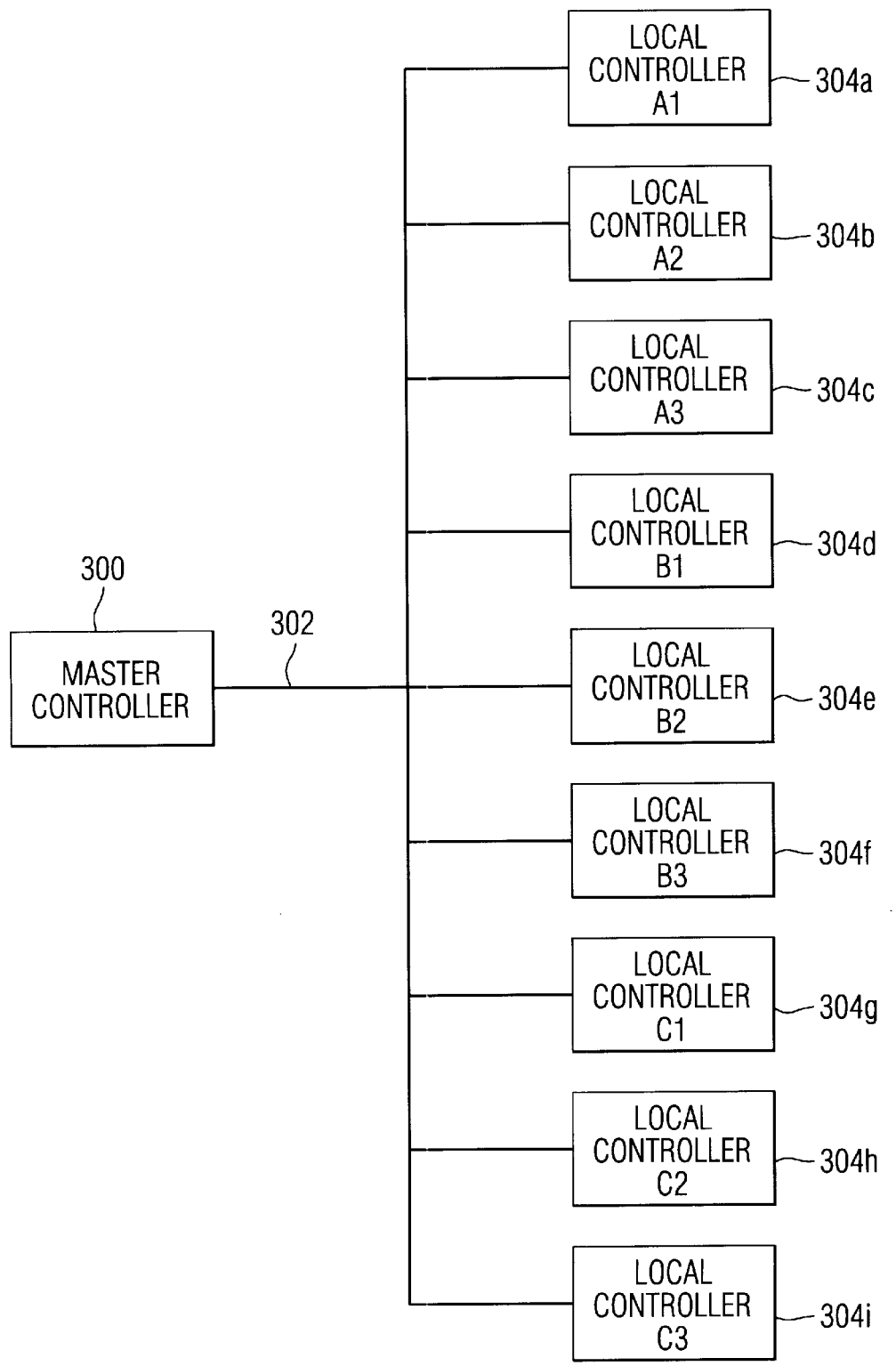
FIG. 5 is a schematic diagram of a prior art control system for operating the regenerative power cell shown in FIG. 3.

The IGBTs 202–212 can be controlled by local modulation controllers 304a–304i, as shown in FIG. 5. Master modulation controller 300 can be seen to transmit modulation control signals to and accept control information from local modulation controllers 304a through 304i. Each local controller 304a–304i can be like local controller 100 as shown in FIG. 2 and as described in connection therewith. Likewise, master controller 300 of can be like the master controller 104 described in connection with FIG. 2. The control signals can be bi-directionally transmitted by way of fiber-optic modulator control links 302. These modulator control links 302 may also be like the modulator control link 102 described in connection with FIG. 2.

Presently, no conventional medium voltage, multiple power cell AC drives provide four quadrant operation permitting power regeneration. Consequently, the addition of the power regeneration transistor bridge can provide an important added benefit to existing medium voltage AC drives. Significantly, this power regeneration capability can be accomplished with minimal modifications to existing medium voltage AC drives of the type disclosed in the aforementioned Hammond patent. Generally, such two quadrant AC drives can be converted to four quadrant operation utilizing a four quadrant power cell according to the present invention in place of the present two quadrant power cell.

While specific embodiments of, and methods for practicing, the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting to the scope of the invention which is to be given the fill breadth of the following claims and any and all embodiments thereof.

What is claimed is:

1. A four quadrant AC power drive for a multi-phase AC load comprising:

a. a multi-phase power transformer having at least one primary winding circuit and a plurality of secondary winding circuits, said primary winding circuit electrically connectable to a multi-phase AC power source;

b. said plurality of power cells each having an input rectifier portion connected to a respective one of said plurality of secondary winding circuits, a capacitor portion fed from said rectifier portion and an inverter portion converting DC power between said capacitor portion and a single phase adjustable frequency output;

c. said plurality of power cells each being serially connected with respective other ones of said plurality of power cells to feed said multi-phase AC load; and d. a plurality of regenerative bridge converters connected to respective ones of said plurality of power cells to feed power from said capacitor portion back into said AC source in a regeneration mode.

2. The four quadrant AC drive of claim 1 wherein said rectifier portion further comprises a diode bridge.

3. The four quadrant AC drive of claim 2 wherein each of said plurality of regenerative bridge converters further comprises a first plurality of semiconductor switches each operably connected to said rectifier portion, said capacitor and said inverter portion of respective ones of said plurality of power cells, selected ones of said first plurality of semiconductor switches being connected to selected others of said first plurality of semiconductor switches in an H-bridge configuration, and each of said first plurality of semiconductor switches being connected to a control circuit.

4. The AC drive of claim 3 wherein said inverter portion further comprises a second plurality of semiconductor switches each operably connected to said rectifier portion, said capacitor and respective ones of said first plurality of regenerative bridge converters, selected ones of said second plurality of semiconductor switches being connected to selected others of said second plurality of semiconductor switches in an H-bridge configuration, and each of said second plurality of semiconductor switches being connected to said control circuit.

5. The AC drive of claim 4 wherein at least one of said first and second plurality of semiconductor switches are power transistors.

* * * * *